United States Patent [19]

Kohashi

[11] 4,383,265
[45] May 10, 1983

[54] ELECTROOSMOTIC INK RECORDING APPARATUS

[75] Inventor: Tadao Kohashi, Moriguchi, Japan

[73] Assignee: Matsushita Electric Industrial Co., Ltd., Kadoma, Japan

[21] Appl. No.: 291,502

[22] Filed: Aug. 10, 1981

[30] Foreign Application Priority Data

Aug. 18, 1980 [JP] Japan .............................. 55-113887

[51] Int. Cl.³ ............................................. G01D 15/16
[52] U.S. Cl. ................................................ 346/140 R
[58] Field of Search ................................... 346/140 R

[56] References Cited

U.S. PATENT DOCUMENTS 4,315,267  2/1982  Sonoda .............................. 346/140 X
4,333,086  6/1982  Ebi .................................. 346/140 R 3,750,564  8/1973  Bettin .............................. 346/140 X
4,206,467  6/1980  Fujii ............................... 346/140 R
4,315,267  2/1982  Sonoda .............................. 346/140 X
4,333,086  6/1982  Ebi .................................. 346/140 R Primary Examiner—Joseph W. Hartary
Attorney, Agent, or Firm—Cushman, Darby & Cushman

[57] ABSTRACT

A novel ink printing apparatus utilizes electroosmotic force on a face of dielectric substance substrate 10 between a needle shaped recording electrode 20 and a ring shaped auxiliary electrode 30. When a voltage of a suitable polarity is applied between the electrodes 20 and 30, a fluid ink (of solvent ink) 40 laid on the dielectric substrate 10 to range from the electrodes 30 to 20 travels by the electroosmotic force and makes protrusion 41 on the end tip 20' of the recording electrode 20. By applying a high voltage between a counter electrode 60 behind a recording paper 50 and the recording electrode 20, the fluid ink 41 flies to the recording paper.

16 Claims, 17 Drawing Figures

F I G. 1(a)
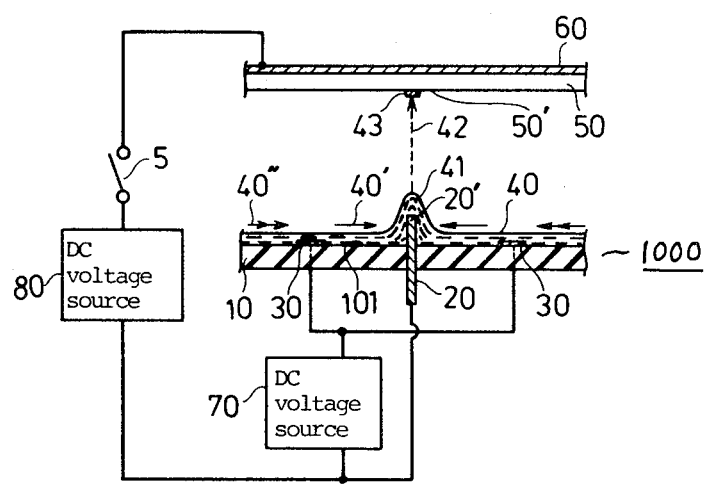
F I G. 1(b)
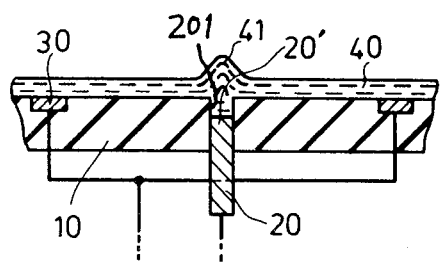
F I G. 2
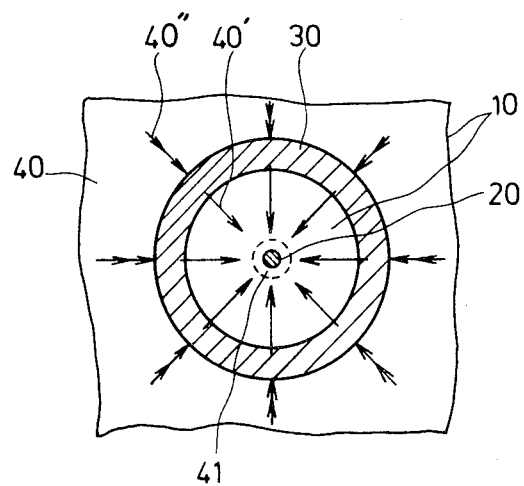

F I G. 3
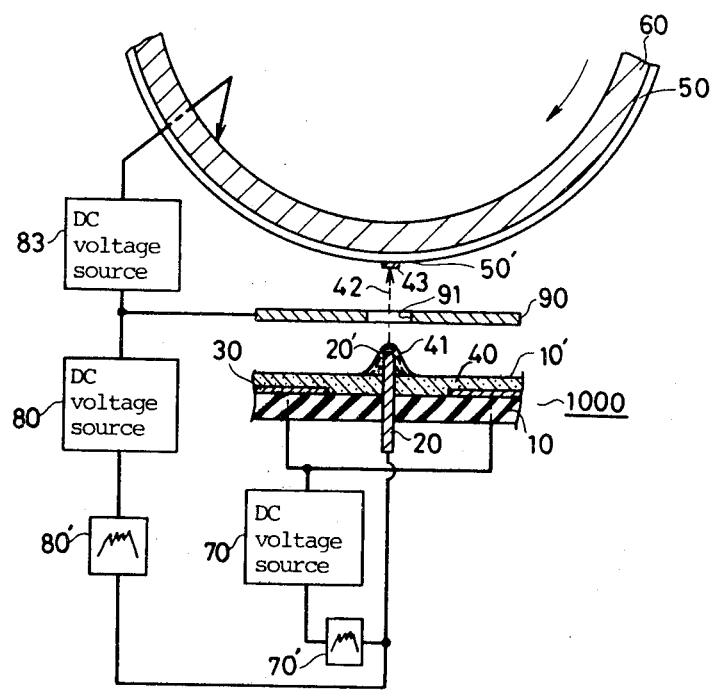
F I G 4
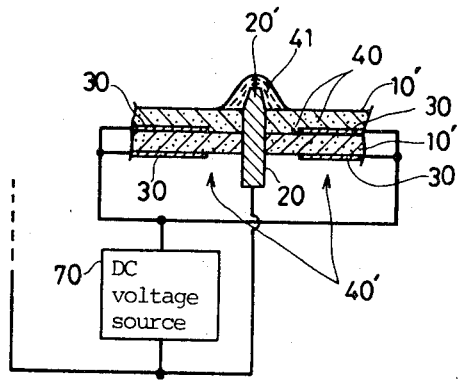

FIG 5(a)
FIG 5(b)
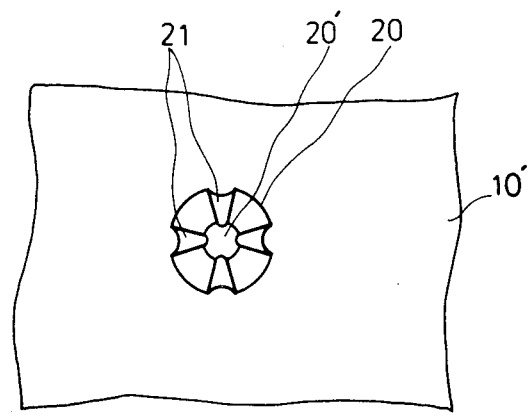
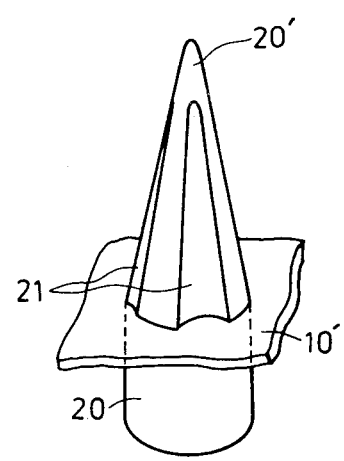
FIG 6(a)
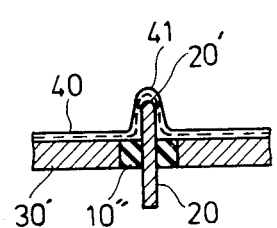
FIG 6(b)
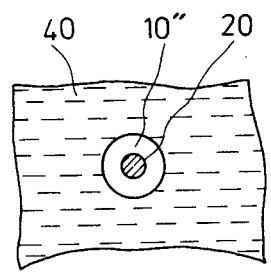

F I G. 11
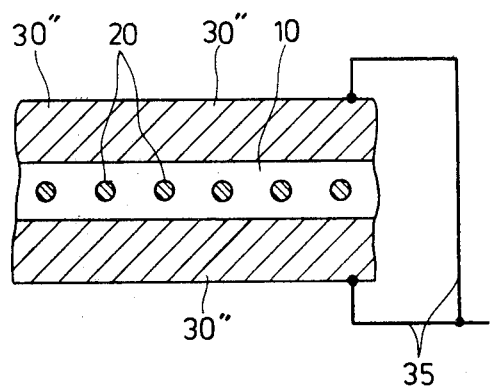
F I G. 12
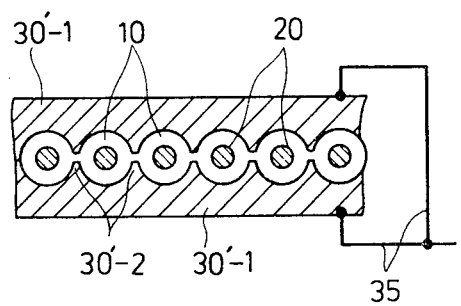

ELECTROOSMOTIC INK RECORDING APPARATUS

BACKGROUND OF THE INVENTION

1. Field of the Invention

The present invention relates to a novel apparatus of picture recording which makes ink printing.

2. Description of the Prior Art

As method of picture recording on a plain paper, several methods have been proposed. Among such proposed methods, ink-jet method and magnetic fluid ink method are known as practical methods.

The ink-jet method has several types therein, but the fundamental principle thereof is that fluid ink is spouted from a nozzle having a very fine hole on a plain paper. Among the ink-jet method, a method called ink-on-demand type (disclosed by E. Stemme et al. in IEEE Transactions on Electron Devices vol. ED-20 p14), which modulates amount of the spouted ink corresponding to picture signal by utilizing electric vibration of a piezoelectric device, is attracting an attention, since it can easily carry out a high speed recording.

On the other hand, magnetic ink recording method has several types, and among them a method called as magnetic ink flying recording (disclosed by Yoichi Sekine et al. in the Japanese unexamined Patent publication No. SHO54-23534), which makes fluid magnetic ink to become protruded by means of magnetic force, is attracting attention in simplicity and high resolution.

The above-mentioned ink-jet method has a defect which is substantially difficult to eliminate. That is, the nozzle with a fine hole is likely to be choked with dried ink which makes the operation impossible. This is the most important and difficult point to improve.

The above-mentioned magnetic ink flying method requires an inclusion of magnetic fine powder of, for instance, magnetite or γ-ferrite. These magnetic powder is likely to cause chemical change due to oxidation, etc., and makes the record change from black color to brownish black color. Besides, color of the magnetic ink is limited and therefore range of color selection of the ink is narrow; especially, to produce inks of high color purities of cyan, magenta and yellow have been very difficult, and therefore, color printing by the magnetic ink method has been technically difficult.

SUMMARY OF THE INVENTION

The present invention purposes to provide a novel picture recording method which can dissolve the above-mentioned problems. The method of the present invention utilizes electroosmotic (or electrokinetic) phenomenon to make fluid ink form protruding surface, and fly onto a surface of a plain paper, and the protruding is controlled by picture signal, so that a picture is recorded on the plain paper.

BRIEF EXPLANATION OF THE DRAWING

FIG. 1(a) is a sectional view of an apparatus of fundamental example embodying the present invention, FIG. 1(b) is a sectional view of a part of another example of the present invention, FIG. 2 is a plan view showing electrode disposition and movement of ink of the apparatus of the examples of FIG. 1(a) and FIG. 1(b), FIG. 3 is a sectional view of an apparatus of another example of the present invention, FIG. 4 is a sectional view of a part of another example of the present invention.

FIG. 5(a) is a plan view and FIG. 5(b) is a perspective view of a recording electrode of an apparatus of another example of the present invention.

FIG. 6(a) is a sectional view of a part of another example of the present invention, FIG. 6(b) is a plan view of the apparatus of FIG. 6(a), FIG. 11 is a plan view of a part of another recording head embodying the present invention, FIG. 12 is a plan view of a part of another recording head embodying the present invention.

DESCRIPTION OF PREFERRED EMBODIMENT

Figure 7:
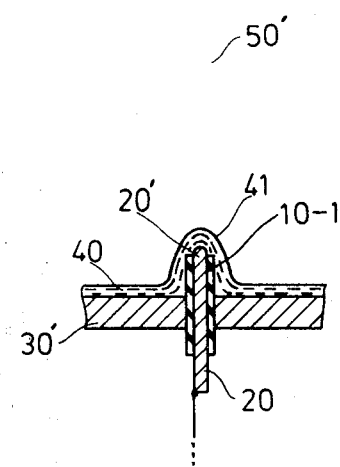
FIG. 7 is a sectional view of a part of another example of the present invention.

A picture recording apparatus in accordance with the present invention comprises a recording head having:

a recording electrode having an end tip to be disposed to face a planar recording media with a predetermined gap inbetween, an auxiliary electrode disposed isolated from and surrounding said recording electrode and, a substrate of dielectric substance disposed between said recording electrode and said auxiliary electrode, said substrate forming electroosmotic travelling path for a fluid ink between said recording electrode and said auxiliary electrode, when a voltage is impressed across said recording electrode and said auxiliary electrode.

In this invention the term fluid ink is defined as a fluid comprising a fluid as a solution or a dispersion media, a dye as solute dissolving in the solution or pigment as disperse phase dispersing in the dispersion media, and other additives, for instance, vehicle substance or binder, charge control agent, surfactant etc.

The term electroosmotic phenomenon or electrokinetic phenomenon is defined that, when a solid state substance and a liquid state fluid are contacting with each other, an interfacial electric double layer is formed, and when an electric field having a component parallel to the interface is impressed on the interface, a force to move the fluid in relation to the solid state substance, thereby making the fluid travel along the interface in relation to the solid state substance.

In this invention the substrate of a dielectric substance includes not only solid dielectric substance but also porous or spongy dielectric substance which has a considerable area of internal surfaces within its body and can form the interface on the internal in its body.

The invention is further elucidated in detail with reference to the attached drawing showing embodiments of the present invention.

FIG. 1(a) shows a fundamental example apparatus which comprises a dielectric body as a substrate 10, a recording electrode 20 of a fine wire or rod of a conductor disposed perpendicularly penetrating the substrate 10, and an auxiliary electrode 30 of a conductor or conductors disposed isolated from and surrounding the recording electrode 20. The dielectric substrate 10 is formed so that its surface is connected at one end to the recording electrode 20 and at the other end to the auxiliary electrode 30. The end tip of the recording electrode is disposed so as closely to face the plain paper or the like recording media 50, which is disposed back by a counter electrode 60. A fluid ink 40 is put on the surface of the substrate 10 in a manner to spread from the auxiliary electrode 30 to the recording electrode 20. Thereby, the fluid ink 40 contacts the auxiliary electrode 30 and the recording electrode 20. A first DC voltage source 70 for the electroosmotic phenomenon is connected across the recording electrode 20 and the auxiliary electrode 30; and a second DC voltage source 80 which has a higher voltage than that of 70 is connected across the recording electrode 20 and the counter electrode 60 with a switch 5 in series thereto. The substance of the dielectric substrate 10 is selected considering electroosmotic characteristic, chemical relation and electrochemical relation with respect to the fluid ink, and usable substances are glasses such as quartz glass, borosilicate glass, ceramics such as alumina, cellulose compounds such as cellulose acetate, cellulose nitrate or mixture thereof, plastics such as polyamide or vinyl chloride, etc. In the example of FIG. 1 the substrate is formed planar or sheet-shape, but as will be described hereinafter, other shapes, such as tube or the like may be usable.

The feature of the present invention is that the axis of the recording electrode 20 is disposed normal to a plane where the auxiliary electrode 30 lies, the recording electrode 20 is pin-shaped or rod-shaped metal wire having, for example, the diameter of about 0.05–0.2 mm, and may have tapered end part at the side facing the recording media 50. The end tip may be either flat small face parallel or tilted to the face of the recording media, needle shape or small hemispherical shape. When the recording electrode 20 has convex face of small radius of curvature at the end tip, the fluid ink 40 can easily fly to the recording media by means of the coulomb force. When the recording electrode 20 has a concave part at the end tip, then the concave part is useful in reserving a considerable amount of fluid ink 40 there, though flying requires higher voltage than the case of convex end tip. The recording electrode 20 should be a conductive material which is resistive against electrochemical corrosion by the fluid ink, therefore when a conductive substance has the resistivity against electrochemical corrosion, a metal, an oxide of metal, carbon or graphite can be used as the recording electrode 20, but carbon or graphite is desirable for either of recording electrode 20 or auxiliary electrode 30 in relation to the polarity of the voltage. The end tip 20″ of the recording electrode 20 may be protruding from the face of the substrate 10, may be flush with the planar surface of the substrate or may be set down off the surface as shown in FIG. 1(b). This is not only in this embodiment but also in the following embodiments, wherein some substrate is made by porous dielectric. In all the cases, namely protruding end tip and set down of the end tip, at least the end face of the recording electrode 20 should be exposed.

The above-mentioned flush-with structure has an advantage of easiness in manufacturing. The above-mentioned protruding recording electrode end tip structure has an advantage that the fluid ink easily fly by means of coulomb force. The above-mentioned set down recording electrode end tip structure has an advantage of the amount of fluid ink reserved in a recording electrode hollow 201 and in electroosmotic protruding part is large, and hence a dense inking on the recording media is made.

In case a porous dielectric substrate is used, the end tip of the recording electrode may be disposed covered by a part of such porous substrate substance, and even in such structure the fluid ink will form electroosmotic protrusion on top of the recording electrode end tip, and is useful in dense inking on recording media.

For the purpose of flying the fluid ink by coulomb force from the electroosmotic protrusion 40 on the end tip part 20′ of the recording electrode 20 to the recording media 50, in the structure of FIG. 1(a) where the recording electrode end tip 20′ is protruding above the surface of the dielectric substrate 10, the recording electrode end tip 20′ should be protruding above the substrate 10 towards the recording media 50 by a height within 100 $\mu$m, and preferably 10 to 60 $\mu$m.

The auxiliary electrode 30 is a thin film of conductor substance such as metal, metal oxide, carbon or graphite, and is formed by vacuum vapor deposition or CVD. Generally, when the auxiliary electrode 30 is impressed with a negative voltage, then it is liable to electrochemical corrosion, the carbon or graphite is preferable. In the embodiment of FIG. 2, the auxiliary electrode 30 is formed on the surface of the dielectric substrate 10 as annular or ring shaped electrode 30′ disposed to encircle the recording electrode 20. This shape is most preferable for effectively protruding the fluid ink on the end tip 20′ of the recording electrode 20 by electroosmosis. Preferable distance between the ring shaped auxiliary electrode 30 and the recording electrode 20 at the center is 0.05 to 1 mm for the viewpoint of practical recording on a paper.

The fluid ink 40 which is prepared by dissolving dye in a fluid solvent or by dispersing pigment in a disperse phase in a fluid dispersion medium, and adding vehicle or binder, charge control agent or surfactant, if any. The fluid ink 40 must have a characteristic (1) showing good electroosmosis for the dielectric substrate 10, and for that sake must have a low viscosity of, for example, 30 centi-stokes (cs) or lower, (2) in order to form high protrusion above the recording electrode end tip, such a low surface tension is necessary as to have a good wetting on the recording electrode 20, and (3) in order to show good flying by coulomb force it must be easily charged, and for this sake the specific resistivity must be $10^8 \Omega$ cm or lower.

For the fluid, that is the solvent or dispersion medium, a substance selected from the followings is usable: water, alcohols, vegetable oils, mineral oils, aliphatic solvents or aromatic hydrocarbon solvents and organosilane solvents. Into the fluid an ionic dye or a non-ionic dye or pigment of diameter smaller than 1 $\mu$m or smaller is introduced with the binder substance and the fluid is blended well. Other additives are further added to the fluid. That is, in order to adjust electroosmotic sensitivity, surface tension and specific resistivity, charge control agent and/or surfactant is further blended in the fluid, thereby to form the fluid ink 40. By means of the above-mentioned preparation, the fluid ink can enjoy the electroosmotic mobility: of about $10^{-4} cm^2/V \cdot sec$. That is, provided that, for instance a DC voltage is impressed across the recording electrode 20 and the auxiliary electrode 30, and the intensity of electric field on the surface of the dielectric substrate is $1V/\mu m$ ($=10^4 V/cm$), then the fluid ink travels at a speed of 1 cm/1 sec. The polarity of electroosmosis, that is the direction of electroosmotic ink flow (towards the positive electrode or negative electrode) is determined by the fluid material, coloring agent (dye or pigment) and other additives. In order to attain good electroosmosis of the fluid ink and to avoid undesirable discoloring of dye or pigment by electrolysis, non-ionic coloring agent is preferred. In case pigment is used, a very fine powder as has been described should be used in order to avoid precipitation. The non-ionic dye (i.e., neutral dye) such as oil-soluble dye (oil-dye or solvent dye) is preferable in order to avoid the precipitation or unstable operation due to cataphoresis of the coloring agent.

For example, for black ink, a mixture of Macrolex Blue FR (trade name of Bayer Japan Ltd. of Japan) and Oil Red XO (trade name of Kanto Chemical Co. Inc. of Japan) is used; as oil-soluble blue fluid ink, a mixture of Macrolex Blue RR (trade name of Bayer Japan Ltd.) is used; as oil soluble yellow fluid ink, Ceres Yellow 3G (trade name of Bayer Japan Ltd.) is used and; as oil-soluble red fluid ink, Oil Red 5303 (trade name of Arimoto Chemical Co. Ltd. of Japan) is used.

The fluid ink 40 is prepared by dissolving, for example, one of the above-mentioned mixture or dye in organic solvent at a concentration of 1 to 5 wt %. In one example where the dielectric substrate 10 is principally of boro-silicate glass or cellulose-acetate, and the recording electrode is impressed with a negative potential, that is the electroosmotic ink flow is made towards the negative electrode, such solvent as γ-methacryloxy-propyl-trimethoxy-silane is used. And when the electroosmosis is made towards the positive electrode, such solvent as phenyl-triethoxy-silane or tetrahexy-silicate is used.

The fluid ink 40 is spread over and contacting the recording electrode 20, auxiliary electrode 30 and dielectric substrate surface 10. The thickness of the fluid ink layer is to be selected considering the wetting and electroosmotic force, and preferable thickness is to be thinner than the height of the protrusion of the recording electrode 20 over the substrate face 10'. Optimum thickness when no voltage is applied between the recording electrode 20 and the auxiliary electrode 30 is 300 $\mu$m or thinner. If this fluid ink layer thickness is excessively thick, then effective protrusion by electroosmotic energy become difficult. On the contrary, if this thickness is excessively thin, effective electroosmotic movement of the fluid ink and protrusion on the recording electrode end tip become difficult. Thus, generally the range of the fluid ink layer thickness should be between 10 $\mu$m and 300 $\mu$m.

The counter electrode 60 is made of a metal sheet such as aluminum or iron, but this can be omitted when the recorded media 50 is made to have a moderately high conductivity.

In order to obtain satisfactory electroosmosis, the auxiliary electrode 30 is to be shaped in a ring concentric with the recording electrode 20, as shown in FIG. 2. When a DC voltage is applied across the recording electrode 20 and the auxiliary electrode 30 from the DC voltage source 70 shown in FIG. 1(a), a centripetal or centrifugal electric field is formed, and thereby a centripetal electroosmotic force 40' is formed on the fluid ink against the dielectric substrate 10, and hence the fluid ink 40 travels to the recording electrode 20. Therefore, by impressing an appropriate polarity DC voltage across the recording electrode 20 and the auxiliary electrode 30, the ink travels to the recording electrode 30 at a speed corresponding to the impressed voltage. As a result of the centripetal travelling of the fluid ink 40 at a certain force, the fluid ink 40 centers to the central part, and climb on the recording electrode to a certain height determined by the surface tension and the electroosmotic force, thus forming protrusion 41 of the fluid ink 40, and to protrusion 41 is impressed with a voltage of the higher DC power source 80 through the recording electrode 20.

The fluid ink forming the protrusion 41 is made fly onto the opposing surface of the recording media 50 to form the recording spot 43.

As the fluid ink 40 travels on the dielectric substrate 10 to the recording electrode 20, the fluid is continuously fed from an area outside the auxiliary electrode 30 by means of its surface tension. The protrusion height is dependent on the intensity of the electric field, which is defined by a difference between the diameter of the recording electrode 20 and the inner diameter of the auxiliary electrode 30 and the voltage of the DC power source 80 applied thereacross. An excessively high voltage leads to a breakdown between the electrodes, and therefore, the impressed voltage should be selected not higher than 2 volts for the distance of 1 $\mu$m ($=2\times10^4$V/cm).

In the configuration of FIG. 2, the higher the ratio of the diameter of inside edge of the auxiliary electrode 30 against the diameter of outside wall of the recording electrode is, the higher the concentration of the fluid ink at the outer side face of the recording electrode 20 becomes. Also the protrusion of the fluid ink is of axial symmetry with respect to the recording electrode axis. Therefore, by selecting the gap between the end tip 20' of the recording electrode 20 and the recording face 50' of the recording media 50 to be about 200 $\mu$m, and a series switch 5 is closed thereby impressing a higher voltage of, for instance 2.1 KV from the voltage source 80 across the counter electrode 60 and the recording electrode 20, then the fluid ink 40 protruding by the coulomb force flies by means of the electric field between the recording electrode end tip 20' and the counter electrode 60, and sticks on the recording face 50' of the recording media, thereby forming an ink spot 43. The consumption of the fluid ink at the protruding reservoir part in front of the recording electrode end tip 20' is immediately compensated or supplied by the surface tension force and electroosmotic travelling of the fluid ink 40. That is, the fluid ink is automatically supplied, and such self-ink-feeding is an important feature of the present invention. When the switch 5 is open, then the flying of the fluid ink 42 stops. Density of printing or density of deposited fluid ink has correlation with the voltage difference between the recording electrodes 20 and the counter electrode 60 and an electric field intensity between the recording electrode 20 and the auxiliary electrode 30. Accordingly the printing density is controlled by at least either one of the voltage between the electrodes 20 and 60 and the electrode 20 and 30. Therefore by modulating either one or both of the voltage by means of picture signal and scanning the relative position of the recording electrode 20 with respective to the recording media, a desired picture is printed by the fluid ink. Furthermore, by providing a plural set of the recording electrode 20 and the auxiliary electrode 30 and printing with fluid inks of various colors, such as black, cyan, magenta and yellow, a brilliant color picture can be printed by means of the apparatus of the present invention, and the printed picture does not have a defect of discoloration due to unstability of the hitherto used magnetic fluid ink.

There are three kinds of modulation of density of flying ink.

A first kind of the modulation is to modulate the voltage of the DC power source 80 appled across the recording electrode 20 and the counter electrode 60, while retaining the voltage of the DC power source 70 applied across the recording electrode 20 and the auxiliary electrode 30 substantially constant so as to always form fluid ink protrusion 41. In this method, a bias voltage of about 1.5 KV is applied between the electrodes 20 and 60, and modulated voltage having maximum amplitude of about 600 V is superimposed thereon corresponding to the picture signal. Then, when the bias voltage of about 1.5 KV only is impressed, the fluid ink does not fly, but when the modulated voltage is superimposed thereon the fluid ink flies and the amount of the fluid ink flow corresponds to the amplitude of the overriding signal. The peak of the voltage to be added across the electrodes 20 and 60 being therefore about 2.1 KV.

A second kind of the modulation is to modulate the voltage of the DC power source 70 applied across the recording electrode 20 and the auxiliary electrode 30, while retaining the voltage of the DC power source 80 applied across the recording electrode 20 and the backing electrode 60 substantially constant at such a high voltage for example 1.9 KV, that makes the fluid ink 40 fly when the fluid ink protrusion 41 is formed. In this method the forming of the fluid ink protrusion 41 is modulated by the picture signal, and hence the density of the ink spot 43 deposited on the recording media surface 50' is modulated by the picture signal information. In order to obtain good gradation and effective modulation, use of a suitable bias voltage on which the picture signal is added is preferable.

A third method is to combine the above-mentioned two method thereby obtaining synergism of both modulations. That is, by modulating both the voltage of the DC power source 70 and the voltage of the DC power source 80 with the same phase picture signal, when the fluid ink protrusion 41 is formed the fluid ink is made to fly, and this method is advantageous in obtaining a picture of high contrast tone. On the other hand, by adjusting the phase difference between the picture signals to be used for both modulations of the DC voltage sources 70 and 80, adjustment of the contrast of picture tone and various effect of printing is made. In this third method, the amplitude of the picture signal for modulating the voltage of the DC voltage source 80 can be lower than the case of the first method.

When the voltage difference between the electrodes 20 and 60 is very high, sometimes the fluid ink happens to fly from the part of the conductor 30' of the auxiliary electrode 30, and lowers quality of the recorded picture. In order to avoid such problem, care should be taken that the picture signal voltage (pulsating or DC voltage) from the recording electrode 20 to the auxiliary electrode 30 and the picture signal voltage (pulsating or DC voltage) from the recording electrode 20 to the backing electrode 60 should have the same polarity. By such selection of the voltages, the voltage between the electrodes 30 and 60 becomes lower than the voltage between the electrodes 20 and 60, and the operation goes well.

The picture recording apparatus in accordance with the present invention has the advantage that there is no problem of choking of ink in ink nozzles or in ink valves, since there is no ink pipe nor ink valve like the conventional ink jet method.

The abovementioned methods of modulation, namely operation of picture recording is applicable to other embodiments which will be described hereafter.

In the picture recording apparatus in accordance with the present invention, the porous dielectric substance can be used as the dielectric substrate 10. For instance, porous glass sheet, porous porcelain or ceramic sheet, porous sheet (woven or non-woven sheet) made with fibres of glass, cellulose are suitable. Known microporous membrane filter comprising of nitrocellulose, acetyl-cellulose, etc. formed in a sheet of thickness of 40 to 200 $\mu$m having fine pores of 0.1 to 8 $\mu$m and the porosity of the sheet should be 60 to 80% is also suitable for the dielectric substrate. In case such porous sheet substrate 10' is used, as will be described referring to FIG. 3 and FIG. 4, the fluid ink 40 is held soaked within the sheet, and therefore, there is no need of holding the dielectric substrate 10' horizontally upwards, and design of the apparatus becomes free. Besides, in such porous substrate 10', the electroosmotic pressure high, since the electroosmotic pressure is inverse-proportional to square of diameter of pores. Therefore, a stable and high protrusion 41 of the fluid ink 40 is obtainable. Furthermore, when the porous substrate 10' is used, the auxiliary electrode 30 can be disposed on the rear face (which is opposite to the face facing the recording media 50) of the porous dielectric substrate 10', and this structure leads to an advantage that undesirable flying of the fluid ink from the part of the auxiliary electrode 30 to the recording media 50. One desirable thickness of the porous substrate 10' is 20 to 200 $\mu$m, and the auxiliary electrode 30 is preferably made by a graphite paint on the rear side of the porous dielectric substrate 10' so as not to receive electrochemical corrosion.

FIG. 3 shows a practical example embodying the present invention, wherein a recording head 1000 comprises a dielectric substrate 10 thereon having a porous substrate 10' of a thickness of, for instance 40 to 200 $\mu$m. A fluid ink of the aforementioned nature is included soaking in the porous substrate 10'. Therefore the fluid ink 40 travels in the porous spaces in the porous substrate 10' and is put out on the end tip 20' of the recording electrode 20. Recording electrode 20 of a metal rod has a small radius of curvature at the end tip for easy flying of the fluid ink therefrom, and is fixed to the substrate 10 and the porous substrate 10' penetrating therethrough with its end tip 20' raised by 10 to 60 $\mu$m above the front face of the porous substrate 10'. A control electrode 90 is for post-stage acceleration and concentration of the fluid ink stream to obtain a sharp printing spot. The control electrode 90 is a metal sheet of for instance 0.3 mm thickness having a through hole 91 of about 1.5 mm diameter for allowing the flying of the fluid ink and is disposed such that its surface is substantially normal to the flying path of the fluid ink stream, and the extension of lower face to the through hole 91 of the control electrode 90 is disposed above the end tip of the recording electrode 20 by about 0.2 mm. Above the control electrode 90 with a gap of about 1 mm, face of a counter electrode 61 of rotatable cylinder of brass is disposed, and a recording media 50 is held partly wrapping around the backing electrode 60.

The application of the voltage is identical in principle to the case of the FIG. 1(*a*), but main difference is an application of a voltage to the control electrode 90, in a manner that the voltage is between those applied to the counter electrode 60 and the recording electrode 20. A DC voltage source 70 feeds a lower bias voltage and a picture signal source 70' feeds a lower picture signal to superimpose the bias voltage for electroosmotic travelling. Another DC voltage source 80 feeds a higher bias voltage of about 1.5 KV, and another picture signal source 80' feeds a higher picture signal of a pulsating voltage having the amplitude of about 600 V for fluid ink flying. Another bias voltage of about 200 V is added by another DC voltage source 83, which accelerate the flying. As the counter electrode drum 60 rotates, the recording media 50 advances and the flying ink 42 in turn records dots 43 along the length of recording media 50. Therefore, by arranging the recording electrodes 20, 20... as shown in the below-mentioned examples (FIGS. 10 to 13) in a direction normal to the paper of FIG. 3, a two dimensional printing is made.

The feature of configuration of FIG. 3 is that gap or space between the recording electrode end tip 20' and the recording media 50 can be selected wide and that by use of the porous dielectric substrate 10' which soakingly hold the fluid ink any angular position of the recording head 1000 is possible. Of course, either of the picture signal source 70' or 80' can be omitted as has been disclosed in the foregoing paragraph describing three methods of modulations.

FIG. 4 shows another embodiment where a plural of porous substrate 10', 10' are disposed in a stacked configuration each other thereby forming a multi-layered porous substrates. An auxiliary electrode 30 of annular ring shaped disc are provided on the lower face (that is on the rear face which is the farer face from the recording electrode end tip 20') of each porous substrate 10'. The top part 20' of the recording electrode 20 is formed in a cone shape so as to obtain a tall fluid ink protrusion 41. The electric connection and operation of the apparatus are substantially the same as the foregoing examples.

In this example, since a plural of the porous substrate 10' are contact stacked, the amount of fluid ink fed to the end tip 20' of the recording electrode by electroosmotic phenomenon becomes large and hence the protrusion 41 becomes tall. The fluid ink to the porous substrate 10' can be fed from the periphery of the substrate 10' and also from the most rear face of the stacked assembly.

FIG. 5 shows an example of the recording electrode 20, where at the top part 20' of the recording electrode 20, a plural number of longitudinal grooves 21,—are formed along its surface, thereby increasing area of the surface at the exposed top part 20', thereby enabling to reserve a large amount of the fluid ink 40, and therefore, a tall protrusion is easily formed by a surface tension force. Such grooved structure is applicable for all examples aforementioned and belowmentioned.

FIG. 6(a) is a sectional view of another example of the present invention, and FIG. 6(b) is a plan view of FIG. 6(a). In this example, a recording electrode 20 is inserted through a hole of an auxiliary electrode 30' of graphite sheet or metal sheet, with a ring 10" of dielectric substance. The axis of the recording electrode 20 is substantially perpendicular to the face of the auxiliary electrode 30'. The fluid ink 40 travels by electroosmosis at the surfaces of the auxiliary electrode sheet 30' and dielectric substance ring 10". Since the dielectric substance ring 10" is very small and short radial distance for the electroosmotic travelling, the general size of this head is small.

FIG. 7 is a sectional view of still another example of the present invention, wherein a sleeve 10' of dielectric substance is disposed around said recording electrode 20 as a dielectric substrate isolating the two electrodes 20 and 30', and an electroosmosis takes place at the outer surface of the dielectric substance sleeve 10-1 so that direction of protrusion of the fluid ink 40 and the direction of the electroosmosis is identical, and therefore loss of the electroosmosis force is eliminated.

Figure 8:
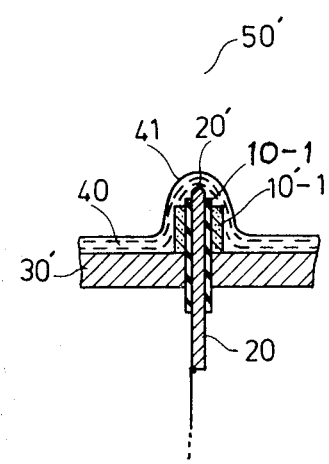
FIG. 8 is a sectional view of a part of another example of the present invention.

FIG. 8 is a sectional view of another example of the present invention, wherein on top of the structural feature of FIG. 7, the apparatus has another sleeve of porous substrate 10'-1 along the outer surface of the dielectric substance tube 10-1. In this example, a large amount of the fluid ink can be reserved by an efficient electroosmosis carried out in the porous substrate sleeve 10'-1. This example apparatus has the advantage that the protrusion of the fluid ink becomes tall.

Figure 9:
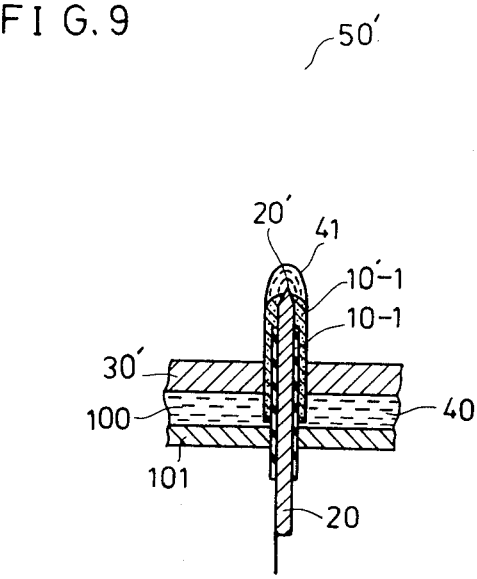
FIG. 9 is a sectional view of a part of another example of the present invention.

FIG. 9 is a sectional view of another example where, modified from the configuration of FIG. 8, the porous substance sleeve 10'-1 directly contacts the recording electrode 20 at part of proximity to the end tip 20' of the latter 20, and the rear end of the porous substance sleeve 10'-1 is soaked in a fluid ink 40 in a reservoir 100 formed between the auxiliary electrode sheet 30' and a parallelly underlying wall 101. Therefore, the fluid ink 40 goes up in the porous substance sleeve 10'-1, and then is pulled up by the electroosmotic force between the auxiliary electrode 30' and the recording electrode 20, and forms a fluid ink protrusion 41. The structure of the example is advantageous in smooth feeding of fluid ink to the top part of the recording electrode.

For further actual use, it is desirable that a number of recording electrode are provided in a recording head. Such multi-stylus configuration is shown in FIGS. 10 to 13.

Figure 10:
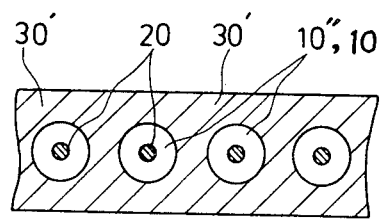
FIG. 10 is a plan view of a part of a recording head embodying the present invention.

FIG. 10 is a plan view with fluid ink layer 40 omitted of a multi-stylus type configuration of the recording head embodying the present invention. A number of recording electrodes 20, 20, ... are disposed in a parallel row. Auxiliary electrodes are formed in a single conductor body 30' having a number of through holes, in each of which a ring-shaped dielectric substrate 12 is inserted with the recording electrode 20 penetrating therethrough. Alternatively, the dielectric substrate 12 is formed continuous under the auxiliary electrode 30'. Preferable pitch of the recording electrode is for example 6 to 8 electrodes per 1 mm. By applying the linear row of the recording electrodes of FIG. 10, for example, in the recording apparatuses of FIG. 1 and FIG. 3, in a manner that the row is in the direction perpendicular to the sheet in FIG. 1 and FIG. 3, it is possible to print a picture. That is a horizontal line of the picture or image can be printed by sequentially shifting fluid ink flying from one end to the other end of the row. That is the horizontal scanning is done by shifting of recording electrode and the vertical scanning is done by slowly moving the paper by rotating the backing electrode drum 60.

FIG. 11 is a plan view of another example of multi-stylus type printing head where the auxiliary electrodes is formed by two parallel conductor strips 30", 30" disposed on both sides of a strip shaped dielectric substrate 10, in a manner inner edges are opposing each other and a row of parallel recording electrodes 20, 20 ... are disposed penetrating the dielectric substrate 10. The two parallel conductor strips 30", 30" ... are common-connected by a connecting wire 35. This configuration is simple and hence is easy for assembling.

FIG. 12 is a plan view of another example of multi-stylus type printing head, wherein the improvement in comparison with the example of FIG. 11 is that the auxiliary electrode 30'-1 has separation edges 30'-2 which is formed round to surround and separate recording electrodes 20 from neighboring ones, so as to prevent interferences between the operations of the neighboring electrodes 20.

Figure 13:
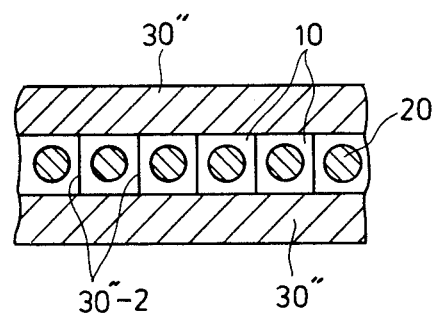
FIG. 13 is a plan view of a part of another recording head embodying the present invention.

FIG. 13 is a plan view of another example of multi-stylus type printing head, wherein the improvement in comparison with the example of FIG. 11 is to provide isolation conductor strips 30''-2 of about 10 μm width is disposed between neighboring two recording electrodes 20 and bridging two conductor strips 30'' and 30'' on both sides of the dielectric substrate strip 10.

Figure 14:
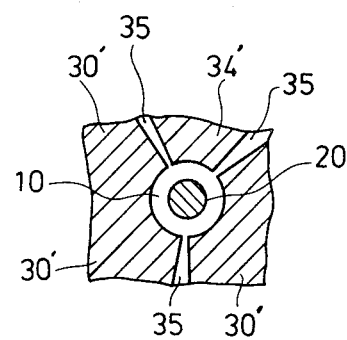
FIG. 14 is a part of another recording head embodying the present invention.

FIG. 14 is a plan view of another example of printing head, wherein auxiliary electrode 30' is slit into several pieces by channel cuts 35, and the split pieces 34' may be connected outside wires in accordance with necessity. Thus easy designing to use printed circuit substrate for this head become applicable.

What is claimed is:

1. A picture recording apparatus comprising:
   an ink printing head for energizing fluid ink responding to input picture signal, said ink printing head including at least a recording electrode having an end tip to be disposed to face a recording media face with a predetermined gap inbetween, an auxiliary electrode disposed isolated from and surrounding said recording electrode and, a substrate of dielectric substance disposed between said recording electrode and said auxiliary electrode, said substrate forming electroosmotic travelling path for a fluid ink between said recording electrode and said auxiliary electrode, when an electroosmosis voltage is impressed across said recording electrode and said auxiliary electrode, thereby to bring said fluid ink to an energized state that said fluid ink protrudes on said end tip,
   a moving means for moving said recording media face relatively of said ink printing head thereby making ink printing on said recording media by transferring said fluid ink at said energized state.

2. A picture recording apparatus in accordance with claim 1, which further comprises a voltage source for impressing a higher voltage across said recording electrode and a counter electrode disposed behind said recording media, for making said fluid ink at said energized state fly from said end tip to said recording media face by means of coulomb force based on said higher voltage.

3. A picture recording apparatus in accordance with claim 1, which comprises an electroosmosis voltage modulating means for modulating said electroosmosis voltage responding to said input picture signal.

4. A picture recording apparatus in accordance with claim 2, which comprises a flying voltage modulating means for modulating said higher voltage responding to said input picture signal.

5. A picture recording apparatus in accordance with claim 4, which comprises an electroosmosis-voltage modulating means for modulating said electroosmosis voltage responding to said input picture signal.

6. A picture recording apparatus in accordance with claim 1, wherein at least a part of said dielectric substance substrate is a porous dielectric substance and said electroosmotic travelling path is formed in said porous dielectric substance.

7. A picture recording apparatus in accordance with claim 1, wherein said auxiliary electrode (30'', 30' or 30'-1) consists of two or more sheet shaped conductors disposed in a plane perpendicular to the axis of said recording electrode 20 and opposing each other embracing said recording electrode (20) and said dielectric substance substrate (10) therearound.

8. A picture recording apparatus in accordance with claim 1, wherein said recording electrode (20) is disposed penetrating said dielectric substance substrate (10, 10', 10-1, 10'-1 or 10'').

9. A picture recording apparatus in accordance with claim 1, wherein said recording electrode (20) is covered with a dielectric substance sleeve (10-1) except its end tip part.

10. A picture recording apparatus in accordance with claim 1, wherein said dielectric substance substrate comprises a non porous dielectric substance substrate (10) and an overriding porous dielectric substance substrate (10') contacting thereto, said auxiliary electrode (30) is disposed at the interface between said non porous dielectric substrate substance (10) and said porous dielectric substance substrate (10'), and said end tip (20') of the recording electrode 20 is disposed above the surface of said porous dielectric substance substrate (10').

11. A picture recording apparatus in accordance with claim 1, wherein said dielectric substance substrate comprises at least two each ther contacting dielectric substance substrate (10', 10'), at least surface side one, which is on the side nearer to said end tip, of said dielectric substance substrate being a porous dielectric substance substrate and each dielectric substance substrate comprising auxiliary electrode at its rear face which is the face farther from said end tip.

12. A picture recording apparatus in accordance with claim 1, wherein said recording electrode (20) is rod or needle shaped, covered by a non porous dielectric substance substrate (10-1, 10'') exposing said end tip part and disposed penetrating said auxiliary electrode (30'), which is shaped in a sheet, said recording electrode (20) and said auxiliary electrode being insulated by said non porous dielectric substance substrate (10-1, 10''), a front face of said auxiliary electrode (30') forming an extended part of said electroosmotic travelling path to feed said fluid ink therefrom.

13. A picture recording apparatus in accordance with claim 12, wherein end tip of said recording electrode (20) is protruding about the front face of said auxiliary electrode (30'), said dielectric substance substrate (10-1) is formed in a sleeve shape and a porous dielectric substance sleeve (10'-1) is provided to surround said sleeve shaped dielectric substance substrate (10-1).

14. A picture recording apparatus in accordance with claim 13, wherein said porous dielectric substance substrate (10'-1) of sleeve shape extends penetrating said auxiliary electrode (30') towards rear side of it, the extended part of said porous dielectric substance substrate (10'-1), which is on the rear side of said auxiliary electrode 30' forming an ink feed-in means of said electroosmotic travelling path.

15. A picture recording apparatus in accordance with claim 2, which further comprises
   a control electrode (90) disposed between said recording media and said end tip (20') of the recording electrode (20), said control electrode (90) having a through-hole for passing flying beam of fluid ink from the end tip (20') to the recording media and impressed with a voltage to accelerate said flying beam of fluid ink, at least either of a voltage between said recording electrode (20) and said control electrode (90) and a voltage between said recording electrode (20) and said auxiliary electrode (30) being modulated responding to said picture signal, thereby to modulate said flying beam by said picture signal.

16. A picture recording apparatus in accordance with claim 2, wherein said electroosmosis voltage measured from said recording electrode (20) to said auxiliary electrode (30, 30', 30'', 30'-1) and said higher voltage measured from said recording electrode (20) to said counter electrode (60) are in a relation that:

(1) said electroosmosis voltage and said higher voltage are of the same polarity and
(2) said electroosmosis voltage is in the polarity to make said fluid ink travel in a direction from said auxiliary electrode (30, 30', 30'', 31'-1) to the recording electrode (20) thereby to form protrusion of fluid ink on said end tip (20') of the recording electrode (20).

* * * * *